United States Patent [19]

Abolins et al.

[11] Patent Number: 4,900,786
[45] Date of Patent: Feb. 13, 1990

[54] POLYPHENYLENE ETHER/RUBBER MODIFIED POLYSTYRENE COMPOSITION SUITABLE FOR BLOW MOLDING LARGE PARTS

[75] Inventors: Visvaldis Abolins; Alexandros Hasson, both of Delmar, N.Y.

[73] Assignee: General Electric Company, Selkirk, N.Y.

[21] Appl. No.: 210,733

[22] Filed: Jun. 23, 1988

[51] Int. Cl.⁴ .............................................. C08L 51/04
[52] U.S. Cl. ........................................ 525/68; 525/92; 525/101; 525/132; 525/133; 525/151; 525/152
[58] Field of Search .................. 525/132, 905, 68, 92, 525/101, 133, 151, 152

[56] References Cited

U.S. PATENT DOCUMENTS

| | | | |
|---|---|---|---|
| 3,306,874 | 2/1967 | Hay | 528/215 |
| 3,306,875 | 2/1967 | Hay | 528/215 |
| 3,383,435 | 5/1968 | Cizek | 525/132 |
| 4,128,602 | 12/1978 | Katchman et al. | 525/68 |
| 4,128,603 | 12/1978 | Katchman et al. | 525/68 |
| 4,128,604 | 12/1978 | Katchman et al. | 525/68 |

Primary Examiner—Henry F. Epstein
Assistant Examiner—James J. Seidleck
Attorney, Agent, or Firm—Hedman, Gibson, Costigan & Hoare

[57] ABSTRACT

Polyphenylene ether/rubber modified polystyrene compositions are uniquely suitable for flow molding large, e.g., 10 pounds or more, parts when the rubber modified polystyrene contains at least 12 percent by weight of particulate rubber, the rubber particles have an average diameter of greater than about 3 microns, and the compositions have an R* value of greater than about 16. R* is the ratio of the low shear rate viscosity to the high shear rate viscosity at the optimum processing temperature.

7 Claims, 1 Drawing Sheet

POLYPHENYLENE ETHER/RUBBER MODIFIED POLYSTYRENE COMPOSITION SUITABLE FOR BLOW MOLDING LARGE PARTS

This invention relates to thermoplastic compositions having high melt strength and to hollow articles blow molded from them. More particularly, it pertains to articles blow molded from compositions comprising polyphenylene ether resins and rubber modified polystyrene resins.

BACKGROUND OF THE INVENTION

Compositions comprising polyphenylene ether resins and high impact rubber modified polystyrenes are well known in the art and have achieved great commercial significance as engineering thermoplastics from which many important shaped articles are made.

The compositions are disclosed and claimed, for example, in Katchman and Lee, U.S. Pat. Nos. 4,128,602; 4,128,603, and 4,128,604. Typically, they can comprise 40 parts by weight of poly(2,6-dimethyl-1,4-phenylene ether) and 60 parts by weight of a rubber modified polystyrene. In preferred embodiments, the rubber will comprise a high-cis polymerized butadiene in particulate form at a content of about 8 percent by weight of the rubber modified polystyrene, the particle sizes will be of a maximum mean diameter of about 2 microns, and the gel content will be greater than about 22 percent by weight. While such compositions are eminently suitable for many uses, such as making business machine housings and automotive parts and foamed packaging materials, they have a major drawback and that is a tendency to provide blow molded articles with poor surface characteristics and they cannot be used to make large blow-molded parts because of collapsing parisons during the molding process. Experiments have shown that neither keeping all factors constant except for increasing the rubber particle size above 3 microns nor increasing both rubber content to a range of 18-25 percent and particle size above 4 microns (with a substantial content of plasticizing phosphate flame retardant present) provides compositions capable of blow molding large parts, e.g., of greater than 10 pounds by weight. At the present state of the art it is very desirable to provide large blow molded hollow articles comprised of polyphenylene ether resin/rubber modified polystyrene resin compositions because of their inherently high strength, environmental resistance and excellent weatherability and dimensional stability. Special mention is made of doors for houses which could be made without sacrificing trees.

It has now been discovered that such compositions and blow molded articles can be provided in accordance with this invention by providing a composition which has a high ratio of low shear rate viscosity to high shear rate viscosity at the optimum processing temperature for the particular composition. This parameter, which will be referred to herein and in the appended claims as the "R* value" appears to correlate with blow moldability of the compositions and it has been discovered that R* values of above about 16 provide uniquely suitable blow moldable compositions. None of the prior art compositions known to applicants herein which comprise polyphenylene ether resins and rubber modified polystyrene resins have an R* value approaching 16; the conventional material first above mentioned has an R* value of about 10. When attempts are made to blow mold this into full size house doors, 40 pounds of resin are needed, and the parison occasionally collapses making continuous production problematic. On the other hand, if a rubber modified polystyrene is used having a high percentage of rubber content and particle sizes above about 3 microns and if the R* value of the composition is greater than about 16, full size doors are readily blow molded in accordance with this invention, without blow out, without warping and having good corners, in a drastically reduced cycle time, using as little as 24 pounds of resin. In full production at the rate of 600 to 700 pounds per hour, 20 doors can be produced per hour, a very significant advantage.

SUMMARY OF THE INVENTION

Figures 1, 2:
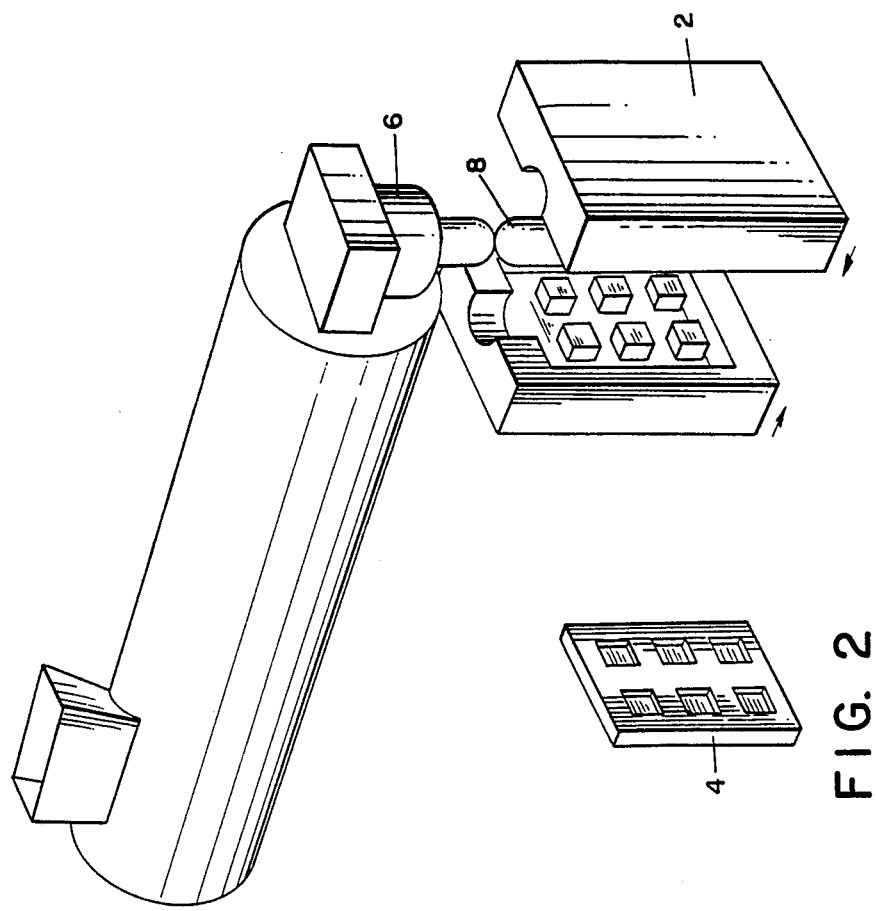
FIG. 1 The drawing illustrates in semi-schematic fashion, an extrusion blow-molding technique which is one means for preparing the articles, especially large blow molded articles such as a door for a house by practicing this invention.
FIG. 2 shows a product produced by the blow molding technique of FIG. 1.

According to the present invention there are provided thermoplastic compositions suitable for blow molding large parts, said composition comprising:
  (a) from about 5 to about 95 parts by weight of a polyphenylene ether resin; and
  (b) from about 95 to about 5 parts by weight of a rubber modified high polystyrene resin having a particulate rubber content of greater than about 12 percent by weight, based on the weight of component (b), the rubber particles having an average diameter of greater than about 3 microns, the composition having an R* value of greater than about 16, the R* value being defined as the ratio of the low shear rate viscosity and the high shear rate viscosity at the optimum processing temperature as determined in a viscometer.

Preferably, the R* value is greater than about 18; component (a) comprises from 5 to 40 parts by weight and component (b) comprises from 95 to 60 parts by weight; the component (a) preferably comprises poly (2,6-dimethyl-1,4-phenylene ether), poly(2,6-dimethyl-co 2,3,6-trimethyl-1,4-phenylene ether) or a mixture thereof; the polystyrene resin preferably comprises a polybutadiene rubber, the rubber content preferably is from about 18 to about 25 percent by weight of the polystyrene resin; and the compositions may also include an effective amount of (c)(i) an impact modifier, (c)(ii) a reinforcing agent, (c)(iii) a flame retardant agent, or a mixture of any of the foregoing.

Among its features the invention also includes a hollow shaped article blow molded from the thermoplastic compositions as above defined, and a process for blow molding such articles.

Special mention is made of hollow shaped articles as defined above which weigh more than about 10 pounds, and those which are substantially filled with expanded in place resin foam, especially a polyurethane, a polystyrene or a composition comprising a polyphenylene ether and a polystyrene.

DETAILED DESCRIPTION OF THE INVENTION

A rheological technique for predicting resin blow molding behavior is used to characterize suitable compositions of polyphenylene ethers and high impact rubber modified polystyrenes for use in the present invention. In this technique, which correlates remarkably well with actual blow molding experiments, the melt strength of the composition is measured in the laboratory using the R* technique. The technique involves a viscometer, such as a Rheometrics System IV Mechanical Spectrometer and its use to determine melt viscosities at shear rates between 0.1 and 500 sec$^{-1}$. Numerous experiments have shown that the optimum temperature for parison extrusion is the temperature at which the shear viscosity of the material is 20,000 poise (at 100 sec$^{-1}$). It is also observed that the parison hanging ability correlates with the shear viscosity at low shear rates. Good blow molding materials have high shear viscosity at shear rates of 1 sec$^{-1}$ or lower. The R* is thus defined as the ratio of the low shear rate viscosity and the high shear rate viscosity at the optimum processing temperature:

$$R^* = \frac{\text{viscosity at 1 sec}^{-1}}{\text{viscosity at 100 sec}}$$

As mentioned previously, the optimum high shear viscosity is 20,000 poise. R* then becomes defined as R* = viscosity at 1 sec$^{-1}$/20,000 poise where the low shear viscosity is measured at the optimum melt temperature.

For more details, see T. P. Dunton et al., Polymer Systems Technology, Memo Report PST 83-6.

The validity of the R* value to predict the suitability of polyphenylene ether/styrene resin compositions has been established in field trials and through parison hanging experiments. Only such compositions having an R* value of greater than about 16 and preferably greater than about 18 will be suitable for blow molding large, e.g., greater than about 10 pounds, parts.

The polyphenylene ether resin (a) is normally a homopolymer or copolymer having units of the formula

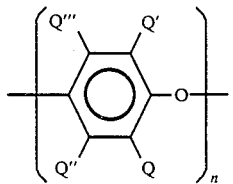

wherein Q, Q', Q", and Q'" are independently selected from the group consisting of hydrogen, halogen, hydrocarbon, halohydrocarbon, hydrocarbonoxy, and halohydrocarbonoxy; and n represents the total number of monomer units and is an integer of at least about 20, and more usually at least 50.

The polyphenylene ether resin can be prepared in accordance with known procedures, such as those described in the U.S. Pat. Nos. 3,306,874 (Hay) and 3,306,875 (Stamatoff), from the reaction of the phenols including but not limited to: 2,6-dimethylphenol; 2,6-diethylphenol; 2,6-dibutylphenol; 2,6-diaurylphenol; 2,6-dipropylphenol; 2,6-diphenylphenol; 2,6-methyl-6-tolylphenol; 2-methoxyphenol; 2,3,6-trimethylphenol; 2,3,5,6-tetramethylphenol, and 2,6-diethyoxyphenol.

Each of these may be reacted alone to produce the corresponding homopolymer, or in pairs or with still other phenols to produce the corresponding copolymer. Examples of the homopolymer include poly(2,6-dimethyl-1,4-phenylene ether), poly(2,6-diethyl-1,4-phenylene ether), poly(2,6-butyl-1,4-phenylene ether), poly(2,6-diauryl-1,4-phenylene ether), poly(2,6-dipropyl-1,4-phenylene ether), poly(2,6-diphenyl-1,4-phenylene ether), poly(2-methyl-6-tolyl-1,4-phenylene ether), poly(2-methyl-6-methoxy-1,4-phenylene ether), poly(2-methyl-6-butyl-1,4-phenylene ether), poly(2,6-dimethoxy-1,4-phenylene ether), poly(2,3,6-trimethyl-1,4-phenylene ether), poly(2,3,5,6-tetramethyl-1,4-phenylene ether), and poly(2,3,5,6-tetramethyl-1,40-phenylene ether), and poly(2,6-diethyoxy-1,4-phenylene ether). Examples of the copolymer include especially those of 2,6-dimethylphenol with other phenols, such as poly(2,6-dimethyl-co-2,3,6-trimethyl-1,4-phenylene ether) and poly(2,6-dimethyl-co-2-methyl-6-butyl-1,4-phenylene ether).

For purposes of the present invention, an especially preferred family of polyphenylene ethers include those having alkyl substitution in the two positions ortho to the oxygen ether atom, i.e., those of the above formula Q and Q' are alkyl, most preferably having from 1 to 4 carbon atoms.

Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

Functionalized polyphenylene ethers, e.g., heat reacted products with compounds like citric acid, maleic anhydride and fumaric acid are also contemplated.

The most preferred polyphenylene ether resins for purposes of the present invention are poly(2,6-methyl-1,4-phenylene ether) or poly(2,6-dimethyl-co-2,3,6-trimethyl-1,4-phenylene ether) resin or a mixture thereof.

The term styrene resin (b) as it is employed in this disclosure is intended to encompass homopolymers, as well as copolymers and terpolymers of alkenyl aromatic compounds with one or more other materials and containing rubber in blended or grafted and/or interpolymerized form in an amount suitable to impact modify the styrene resin. Preferably, the styrene resin is based at least in part on units of the formula

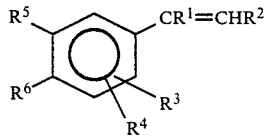

wherein $R^1$ and $R^2$ are selected from lower alkyl or alkenyl groups of from 1 to 6 carbon atoms and hydrogen; $R^3$ and $R^4$ are selected from chloro, bromo, hydrogen, or lower alkyl of from 1 to 6 carbon atoms or a mixture therof; $R^5$ and $R^6$ are selected from hydrogen and lower alkyl and alkenyl groups of from 1 to 6 carbon atoms or a mixture thereof; or $R^5$ or $R^6$ may be concatenated together with hydrocarbyl groups to form a naphthyl group.

The above will encompass styrene, as well as homologs and analogs of styrene. Specific examples include, in addition to styrene, styrene-maleic anhydride copolymer, chlorostyrene, bromostyrene, alpha-methyl styrene, para-methyl styrene, vinyltoluene, divinylbenzene and vinylnaphthalene. Styrene is especially preferred.

The polystyrene component must be modified by admixture or interreaction with a natural or synthetic rubber, for example, polybutadiene, (which is preferred) polyisoprene, EPDM rubber, silicone rubber and the like; or it can be a copolymer or terpolymer of styrene or other alkenyl aromatic compound with an elastomeric or other material, such a block copolymer of styrene and butadiene (for example, AB, ABA, ABAB or ABABA type), including hydrogenated forms of the foregoing, a radial teleblock copolymer of styrene butadiene and a coupling agent, including hydrogenated forms, terpolymers of acrylonitrile, styrene and butadiene (ABS), styrene-acrylonitrile copolymers (SAN), and a copolymer of styrene and maleic anhydride (SMA); or it can also be an alkenyl aromatic copolymer or terpolymer.

Polyphenylene ether resins and styrene resins are combinable in all proportions, e.g., from 1 to 99 parts by weight of the former to correspondingly from 99 to 1 parts by weight of the latter. The addition of (a) to (b) resins offers improvements in impact strength, flammability ratings, tensile strength and other mechanical properties. Conversely, the styrene is blended with polyphenylene ether resin to offer better processability for many thermoplastic processes. Compositions containing less than 5 weight parts of (a) are considered to be primarily styrene resin (b) compositions and do not exhibit the beneficial property improvements needed for high strength blow molded articles having good resistance to heat.

Typical polyphenylene ether/polystyrene resin compositions useful in the practice of the present invention will be comprised of between about 5 to about 95 parts by weight and preferably about 5 to about 40 parts by weight of (a) and about 95 to about 5 and preferably about 95 to about 60 parts by weight of styrene resin based upon the two resins taken together. The rubber can be pr=sent in an amount greater than about 12 percent by weight based on the styrene resin (b), preferably in the range of from about 18 to about 25 percent by weight, same basis. The particle size must be greater than about 3 microns average, measured microscopically. Many polystyrene resins are suitable and commercially available and others can be made in accordance with techniques well known to those skilled in this art. For example, a blend of 75 to 82 parts of crystal polystyrene and from 25 to 18 parts by weight of high-cis polybutadiene can be intensively mixed in a high shear mixer until homogeneous and samples can be periodically taken and microscopically analyzed to insure that the composition is not oversheared thus reducing the average particle size to below about 3 microns. Alternatively polymerization can be carried out in two stages: first a rubber is dissolved in styrene monomer and the solution is agitated and polymerized partially to phase inversion, the agitation speed and intensity providing ultimate particle size control; then the polymer is suspended in water and droplets are formed and polymerization is completed to provide beads of high input polystyrene. A preferred rubber modified polystyrene is available from Gulf Oil Co. as EC-2100.

The polyphenylene ether and rubber modified styrene resins may be combined in a conventional manner. The polyphenylene ether resin will typically be in powder or pellet form and the styrene resin will typically be in pellet form. The resins may be combined as by dry blending in a blender which provides a relatively uniform composition comprising the resins. This composition is typically directed to a thermoplastic extruder, usually of the single, dual single or twinscrew type, where in the case of a mixture the resin is compounded with sufficient temperature and shear to provide an intimate polyphenylene ether/polystyrene composition.

During the blending step it is contemplated that conventional additives may be incorporated in the resin mixture if desired. These include stabilizers for thermal and color stability, antioxidants, processing aids and plasticizers, extending fillers, pigments and the like. Each of these may be utilized to a greater or lesser degree depending on the required final properties desired in the blow-molded product.

The impact modifiers useful as components (c)(i) are conventional for thermoplastics and are used in conventional amounts. Typically, they will comprise methacrylate-butadiene-styrene interpolymers, polyacrylates, ethylene-propylene-diene terpolymers, linear low density polyethylene, selectively hydrogenated styrene-ethylene-butylene-styrene block polymers, glycidyl methacrylate-modified EPDM rubbers, mixtures thereof and the like. From 1 to 30 parts per hundred by weight based on (a) plus (b) will be used.

The reinforcing agents (c)(ii) can vary widely in type and the amounts to be used are conventional. Illustratively, they will include glass, graphite, wollastonite, carbons, metals, e.g., aluminum, iron, nickel, stainless steel and the like, titanates, e.g., titanate whiskers, quartz, clay, mica, talc, mixtures of any of the foregoing and the like. Glass fibers and clay are preferred. The amounts used will range from about 1 to about 40 parts by weight of (c)(ii) per 100 parts by weight of (a) and (b) combined.

The flame retardant agent (c)(iii) if used will be conventional type and amount. It can for example comprise alumina trihydrate; a halogenated aliphatic, e.g., a bromo- or chloro-paraffin alone or combined with antimony oxide as a synergist; a brominated aromatic, e.g., decabromodiphenyl oxide, optionally with an antimony synergist; a phosphate ester; e.g., a trisnonylphenyl phosphate, or red phosphorous. Amounts in the order of about 5 to about 20 parts by weight of (c)(iii) per 100 parts by weight of (a) plus (b) are used, in general.

Blow molding is used to make hollow shaped plastic articles in a variety of commonly encountered forms, such as, doors for houses, milk bottles, auto windshield washer tanks, street light globes, arms and legs on toy dolls, and a multitude of others. Although injection blow molding can be used, extrusion blow molding is simpler and preferred. Extrusion blow molding typically comprises extruding a tube of plastic (parison) into a water-cooled mold, inflating the tube by internally introducing air or another gas until the walls of the molten tube assume the shape of the mold, allowing the shaped tube to cool to structural rigidity, and removing the extrusion blow molded part from the mold.

Extrusion blow molding is illustrated in the drawing which depicts a single mold 2 for a hollow door 4. Mold 2 is moved into location under a single parison die head 6 where parison 8, a round hollow tube, is captured by clamping water cooled mold parts 2 shut, as shown in FIG. 1. A cycle comprises a parison 8 being extruded and captured, a part 4 being molded, molded part 4 being cooled and cooled part 4 is being removed.

Other blow molding processes can also be employed in addition to the above-described extrusion system. These are well-described in "Modern Plastics Encyclopedia", McGraw-Hill Publications Company, 1988, pp. 203-210 (Oct., 1987).

DESCRIPTION OF THE PREFERRED EMBODIMENTS

The following examples illustrate the present invention. They are not to be construed to limit the claims in any manner whatsoever.

EXAMPLES 1-2

Two compositions are prepared comprising 25 parts by weight of poly(2,6-dimethyl-1,4-phenylene ether) resin, General Electric Co., i.v. 0.46, and 75 parts by weight of two different rubber modified polystyrene resins. The first is a product of Gulf Oil Company, designated EC-2100, containg 17-23 percent by weight of polybutadiene; having a melt index of 2.0 -3.5 g/10 min. (ASTM D 1238); a GPC molecular weight, $M_n$ of 40,000-65,000, $M_w$ of 185,000-220,000; a gel fraction of 25-35 wt. percent; a swell index of 12-17; mineral oil content of 4.0-5.5, i.c., and a rubber particle size (VA) of 3.07 microns. The second styrene resin was a product of Norsolor, France, designated GEDEX 6020, containing at least 13 percent of polybutadiene rubber; having a molecular weight, $M_n$ of 50,000, approx, $M_w$ of 160,000; a gel fraction of greater than about 35 weight percent; and a rubber particle size of greater than 4 microns measured by CAPA. For comparison purposes, three compositions were made substituting an equal weight of three rubber modified polystyrenes comprising Huntsman 1000, a product of Huntsman Chemical Co., having a rubber content of 5.5 percent and a particle size of below 3 microns; Huntsman 1897, a product of Huntsman Chemical Co., having a rubber content of below 11.1 percent, and a particle size of 2.6; and Mobil MX 7800, a product of Mobil Company, having a rubber content of 9 percent, and a core-shell particle size of less than 1 micron. The compositions also included 1.5 parts by weight of polyethylene, 0.5 parts by weight of tridecylphosphite, 2 parts by weight of Stereon 840, an impact modifier and thermal stabilizers, 0.3 parts by weight.

The compositions were extrusion blended and the melt viscosities were determined in a Rheometrics System IV Mechanical Spectrometer. The R* values were determined as outlined above. The compositions used and the results obtained are set forth in Table 1 as follows:

TABLE 1.

| Blow moldability of PPE/HIPS Compositions | | | | | |
|---|---|---|---|---|---|
| Example | 1A* | 1B* | 1C* | 1 | 2 |
| Composition (parts by weight) | | | | | |
| Poly(2,6-dimethyl-1,4-phenylene ether) resin | 25 | 25 | 25 | 25 | 25 |
| Rubber Modified Polystyrene resin | | | | | |
| Huntsman 1000 PBD, 5.5%, 1.6 microns | 75 | — | — | — | — |
| Huntsman 1897 PBD, 11.1%, 2.6 microns | — | 75 | — | — | — |
| Mobil Mx 7800 PBD, 9%, 1 microns | — | — | 75 | — | — |
| Chevron EC 2100 PBD, 17-23%, 3.07 microns | — | — | — | 75 | — |
| GEDEX 6020 PBD, 13%, 4 microns | — | — | — | — | 75 |
| Properties | | | | | |
| R*, $\frac{\text{low shear viscosity, sec}^{-1}}{20{,}000 \text{ poise}}$, poise | 14.8 | 15.7 | 15.3 | 19.6 | 18.8 |

*Control

Using these values and correlating them with results obtained on Sterling Blow Molding equipment using a small panel tool the compositions of Examples 1 and 2 are distinctly superior in terms of parison strength to those of Comparative Examples 1A, 1B and 1C.

EXAMPLE 3

A composition comprising 40 parts by weight of PPO and 60 parts by weight of the rubber modified polystyrene (EC-2100) used in Example 1 is prepared. For comparison purposes, a similar composition is prepared substituting 60 parts by weight of rubber modified polystyrene (Huntsman 1897). Both compositions also contain 1.5 parts by weight of polyethylene, 2 parts by weight of KD1101, an impact modifier, and 0.5 parts by weight of tridecyl phopshite. The pelletized composition is molded into a full size house door side-by-side with the comparison composition using extrusion blow molding equipment as generally shown in schematic form in the drawing. The composition according to this invention, having an R* value of 17 molded into a perfect door. The door weighs 16 pounds, and the cycle time is 4 minutes. The door molded from the comparative composition, R* value of 10, is not perfect, does not have filled corners, and has poor surface appearance. The door weighs 22 pounds and requires a cycle time of 7 minutes and 20 seconds.

EXAMPLE 4

For comparison purposes a composition is made in accordance with the prior art. It comprises 45 parts by weight of poly(2,6-dimethyl-1,4-phenylene ether), 55 parts by weight of Gulf EC-2100, a 20% by weight polybutadiene-containing polystyrene, 14 parts by weight of a liquid phosphate ester flame retardant, 1.5 parts by weight of polyethylene and 0.8 parts by weight of thermal stabilizers. The R* value is 14.3. This composition is suitable for blow molding small articles, but not for large parts exceeding 8 to 10 pounds, such as doors for houses.

EXAMPLES 5-10

A series of compositions are prepared by extrusion blending poly(2,6-dimethyl-1,4-phenylene ether) i.v., 0.46 dl/g, and the rubber modified high impact polystyrene designated EC-2100 and described in Example 1. The compositions also contain 1.5 parts by weight of polyethylene, 0.5 parts by weight of tridecylphosphite, 0.15 parts by weight of zinc sulfide and 0.15 parts by weight of zinc oxide per 100 parts by weight of combined resins. The ratios of PPE to HIPS are varied and the compositions are subjected to viscometer measurements to determine their respective R* values and optimum processing temperatures.

The results obtained are set forth in Table 2:

TABLE 2

R* Values and Optimum Processing Temperature for Polyphenylene Ether-Styrene Resin Compositions

| Example | 5A* | 5B* | 5 | 6 | 7 | 8 | 9 | 10 |
|---|---|---|---|---|---|---|---|---|
| Composition (parts by weight) | | | | | | | | |
| poly(2,6-dimethyl-1,4-phenylene ether) | 50 | 45 | 40 | 35 | 30 | 25 | 20 | 15 |
| rubber modified polystyrene resin | 50 | 55 | 60 | 65 | 70 | 75 | 80 | 85 |
| Properties | | | | | | | | |
| R* value | 9.1 | 10.6 | 16.0 | 16.9 | 17.8 | 21.6 | 22.2 | 27.8 |
| Optimum processing temperature, °C. | 257 | 247 | 225 | 222 | 217 | 207 | 196 | 184 |

*Comparative Example

The foregoing data indicate that for those compositions containing from 15 to 40 parts of polyphenylene ether and from 85 to 60 parts of polystyrene resin, large blow molded articles will be readily obtainable. Compositions containing 45 parts or greater of this particular polyphenylene ether and 55 parts or less of this particular polystyrene resin do not exhibit R* values of 16 or greater and blow molding of large articles is not possible with these compositions. However, formulation adjustments are possible to achieve the necessary 16 minimum in R* values, even with compositions 5A* and 5B*. For example, less rubber in the polystryene resin can be used, some crosslinker can be added to the polystyrene or the polyphenylene ether resin to increase the molecular weight of the ether or both. The rubber particle size can be changed, and a different rubber can be used.

EXAMPLES 11-12

Two compositions are prepared by extrusion blending poly(2,6-dimethyl-1,4-phenylene ether) resin i.v., 0.46 dl/g, and rubber modified polystyrene resin, EC-2100, described in Example 1. The compositions also include 1.5 parts by weight of polyethylene, 2.0 parts of SEBS polymer (Shell Company, Kraton® 1101) 0.5 parts by weight of tridecyl phosphite, 0.15 parts by weight of zinc sulfide, and 0.15 parts by weight of zinc oxide, pe 100 parts by weight of combined resins. The R* values of the compositions are determined as previously described; and the compositions are injection molded into specimens for physical property testing. The formulations used and the results obtained are set forth in Table 3.

TABLE 3

Compositions Comprising Polyphenylene Ether and Polystyrene Resins for Blow Molding

| Example | 11 | 12 |
|---|---|---|
| Composition (parts by weight) | | |
| Poly(2,6-dimethyl-1,4-phenylene ether) resin | 40 | 25 |
| Rubber modified polystyrene resin | 60 | 75 |
| Properties | | |
| R* value | 17.1 | 22.0 |
| Melt viscosity at 540° F., poise | 2180 | 1730 |
| Channel flow at 550° F., in. | 14.5 | 15 (at 500° F.) |
| DTUL at 264 psi, °F. | 228 | 203 |
| Izod impact, ft-lb in. notch | 7.1 | 7.0 |
| Dynatup impact in lbs | 317 | 173 |
| Tensile str, psi | 5500 | 4000 |
| Elongation, % | 91 | 85 |

TABLE 3-continued

Compositions Comprising Polyphenylene Ether and Polystyrene Resins for Blow Molding

| Example | 11 | 12 |
|---|---|---|
| Flexural mod., psi | 238,000 | 201,000 |
| Flexural str., psi | 72,000 | 6,000 |

The data show that both compositions according to this invention have excellent physical properties, and that they are eminently suitable for blow molding, especially large parts. As between Examples 11 and 12, Example 12 exhibits somewhat better melt strength at lower melt temperatures than Example 11.

The above mentioned patents and publications are incorporated herein by reference.

Many variations of the present invention will suggest themselves to those skilled in this art in light of the above, detailed description. For example, instead of poly(2,6-dimethyl-1,4-phenylene ether), poly(2,6-dimethyl-co-2,3,6-trimethyl-1,4-phenylene ether) resin can be used. Glass fibers and/or clay can be used as reinforcing agents. Decabromodiphenyl ether and antimony oxide can be added as flame retardants. The hollow shaped articles can be filled with foamed in place cellular polyurethanes, styrene resins and blends of polyphenylene ether resins and blends of polyphenylene ether resin and polystyrene resin. Instead of polybutadiene, EPDM rubber and/or polyisoprene can be used to modify the polystyrene resin. All such obvious modifications are within the full intended scope of the appended claims.

We claim:

1. A thermoplastic composition suitable for blow molding large parts, said composition comprising:
    (a) from about 5 to about 95 parts by weight of a polyphenylene ether resin; and
    (b) from about 95 to about 5 parts by weight of a rubber modified high impact polystyrene resin having a particulate rubber content of greater than about 12 percent by weight, based on the weight of component (b), the rubber particles having an average diameter of greater than about 3 microns, said composition having an R* value of greater than about 16, the R* value being defined as the ratio of the low shear rate viscosity and the high shear rate viscosity at the optimum processing temperature as determined in a viscometer.

2. A composition as defined in claim 1 which has an R* value of greater than about 18.

3. A composition as defined in claim 1 wherein polyphenylene ether component (a) comprises from about 5 to about 40 parts by weight and polystyrene resin component (b) comprises from about 95 to about 60 parts by weight 4. A composition as defined in claim 1 wherein said polyphenylene ether resin (a) is selected from the group consisting of poly(2,6-dimethyl-1,4-phenylene ether), poly(2,6-dimethyl-co-2, 3,6-trimethyl-1,4-phenylene ether) and a mixture thereof.

5. A composition as defined in claim 1 wherein said polystyrene resin (b) is modified with a polybutadiene rubber.

6. A composition as defined in claim 5 wherein said polybutadiene rubber comprises from about 18 to about 25 percent by weight of said polystyrene resin (b).

7. A composition as defined in claim 1 which also includes an effective amount of (c) (i) an impact modifier, (c) (ii) a reinforcing agent, (c) (iii) a flame retardant agent, or a mixture of any of the foregoing.

* * * * *